United States Patent [19]

Shimizu et al.

[11] 4,173,061

[45] Nov. 6, 1979

[54] PROCESS FOR FORMING A BILLET FOR EXTRUSION

[75] Inventors: Kazushige Shimizu, Hoya; Takuma Maeda, Ube, both of Japan

[73] Assignee: Ube Industries, Ltd., Yamaguchi, Japan

[21] Appl. No.: 901,465

[22] Filed: May 1, 1978

Related U.S. Application Data

[63] Continuation of Ser. No. 671,033, Mar. 29, 1976, abandoned.

[30] Foreign Application Priority Data

Apr. 3, 1975 [JP] Japan .................................. 50-39775
Sep. 30, 1975 [JP] Japan ................................ 50-117225

[51] Int. Cl.² .......................... B21C 23/04; B23P 7/00
[52] U.S. Cl. ............................ 29/403.2; 29/DIG. 47; 72/253 R; 72/256
[58] Field of Search .................... 29/403; 72/253, 256

[56] References Cited

U.S. PATENT DOCUMENTS

| 2,100,537 | 11/1937 | Conway | 75/22 |
|---|---|---|---|
| 2,893,113 | 7/1959 | Howell | 29/403 UX |
| 2,898,672 | 8/1959 | Howell | 29/403 X |
| 3,342,638 | 9/1967 | Wanzenberg | 29/403 X |
| 3,626,578 | 12/1971 | Price et al. | 29/403 |
| 4,028,795 | 6/1977 | Takahashi et al. | 29/403 |
| 4,033,024 | 7/1977 | Takahashi et al. | 29/403 |
| 4,050,142 | 9/1977 | Takahashi et al. | 29/403 |

Primary Examiner—Francis S. Husar
Assistant Examiner—V. K. Rising
Attorney, Agent, or Firm—Paul and Paul

[57] ABSTRACT

Scrap bars of extruded goods are reclaimed as billets for extrusion. An external force is applied to an aggregate of scraps, in which the scraps are piled in the form of a bundle having a predetermined length, so as to reduce its size in directions perpendicular to the longitudinal axes of the scrap bars, thereby forming a billet. The extruded goods produced from the billet have almost no pores and are not inferior to those produced from cast billets.

4 Claims, 7 Drawing Figures

PROCESS FOR FORMING A BILLET FOR EXTRUSION

This is a continuation, of application Ser. No. 671,033, filed Mar. 29, 1976, now abandoned.

The present invention relates to a process for forming a billet for extrusion, and, more particularly, a process for forming a billet for extrusion from scrapped metal of extruded goods, such as aluminum sash bars.

The extrusion forming techinque is widely employed for producing, for example, aluminum sash bars. The two end parts of an extruded bar usually cannot be used as a finished article because of their undesirable deformation or bending. The above-mentioned parts, therefore, must be cut off as scrap. Several methods have hitherto been proposed to reclaim such scraps, which amount to approximately 20% of the extruded products.

According to one of the proposed methods, scraps are remelted and then cast into a billet for extrusion. This remelting method, however, is defective in the fact that the remelting process causes air pollution and wasteful loss of metal amounting to from 4 to 5%. In addition, the remelting methods result in high costs for fuel and electric power, a costly and reserve fund for depreciation of a melting shop, and transportation for transporting scraps to melting shop, which is located relatively distant from the extrusion shop, are also high.

According to another of the proposed methods, the scraps of the extrusion products are firstly cut into short lengths, and crushed into scrap metal chips (Japanese publicly disclosed patent application No. 87511/1974). According to this method, scrap metal chips are firstly formed into a billet by a suitable press machine after they are subjected to a cleaning process. Subsequently, the billet is heated to a temperature suitable for extrusion. The heated billet is then supplied to a container of a conventional extrusion press machine and is subjected to an extrusion process. However, in this disclosed method, no consideration has been paid to the fact that the billet formed out of scrap metal chips must inevitably contain air therein, during the pressing process of the chips. Thus, when the billets containing air therein are subjected to the extruding process in an extrusion press machine, many air bubbles appear in the outermost portion of a product formed from said billets. Naturally, an extruded product having many air bubbles cannot be employed as high quality metal material. In addition, a particular apparatus for crushing scraps into chips is required to reclaim the scraps of the extrusion products. Further, when a billet formed from scrap metal chips is heated to a temperature suitable for extrusion, several chips at the outermost portion of the pressed billet can flake off depending upon the amount of pressure used to press the metal chips into a billet.

It is the object of the present invention to eliminate the drawbacks of the previously proposed methods for reclaiming the scraps of the extruded products, by means of providing a method which relies neither on a remelting techinque nor the dividing of the scraps into metal chips.

In accordance with the object of the present invention, there is provided a method for forming a billet for extrusion, comprising the steps of: cutting said scraps into bars having a determined length; piling up said scrap bars in a manner such that the ends thereof are even, thereby forming a scrap aggregate having the predetermined length, and; exerting an external force on the scrap aggregate in directions perpendicular to the longitudinal axes of the scrap bars, thereby forming the billet; wherein the relationship between the number of piled scrap bars and the external force is determined such that, when the cross sectional area of the scrap aggregate is reduced to the cross sectional area of the billet, each scrap bar is rigidly engaged with the neighbouring scrap bars and, further, clearances running through the billet in the longitudinal direction and communicated with the atmosphere are left in the billet.

The scraps of extruded goods, such as aluminum sashes, are firstly cut into a predetermined length, because such scraps are usually of different lengths. The scraps usually consist of two ends portions of the extruded goods which are unusable for final goods. The scraps in the form of bars, which can be reclaimed according to the present invention, should preferably possess an irregular cross section such as typically seen in aluminum sash bars. However, bars of regular cross sectional shapes, such as round, oval and polygonal, can also be reclaimed according to the process of the invention.

The scraps should preferably be cleaned, either before or after the cutting, so as to remove any oil and foreign matter adhered on the scraps. The cleaning is usually performed after the cutting, and the cleaning of aluminum scraps is performed by dipping the same in an alkaline solution.

A large number of the cut and cleaned scrap bars are piled up in a manner such that their ends are even, thereby forming a scrap aggregate having the above-mentioned length. The number of piled scrap bars is determined in a manner such that the diameter of the scrap aggregate will be reduced to the diameter of the reformed billet after the following step of exerting an external force on the aggregate. The scrap bars are arranged parallel to each other. Each scrap bar is brought into contact with the neighbouring scrap bars in the aggregate.

The external force is applied to the scrap aggregate in a perpendicular direction to the longitudinal axes of the scrap bars, until the cross sectional area of the scrap aggregate is reduced to that of the billet for extrusion. The relationship between the external force and the size of the scrap aggregate i.e. number of piled scrap bars, must be such that the scrap bars are rigidly engaged with each other, but that longitudinal clearances between the scrap bars are left in the formed billet and communicate with the atmosphere. It will require greater external force to form a billet from scrap bars having regular cross sections than from scrap bars having irregular cross sections. In practice, the above-mentioned relationship between the external force and the size of scrap aggregate is satisfied when the relative density of the billet, i.e. percentage ratio of the density of billet based on the density of metal of the scrap, is in the range between 70 and 90%, preferably in the range between 80 and 85%.

The present invention is further illustrated by describing several embodiments thereof with reference to the drawings, wherein.

Figure 1:
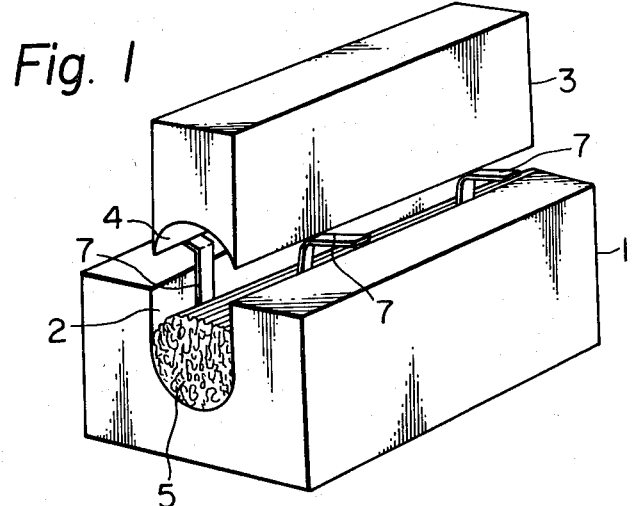
FIG. 1 is a view of dies for forming a billet for extrusion.

In an embodiment of the process according the invention illustrated in FIG. 1, the billet is formed by means of dies composed of a female die part 1 and the male die part 3. The female die part 1 is provided with a recess or groove 2 extending in the longitudinal direction thereof and having a U-shaped wall. The male die part 3 has a length corresponding to the length of the female die 1 and such a width as to be insertable in the recess 2. The male die part 3 is provided with a semicircular lower surface 4. The male die part 3 is lowered by a not shown drive means and advances into the recess 2, until a cylindrical space is formed between the lower surface 4 of the male die part 3 and the wall of the female die part 1.

The scraps of extruded goods are cut to a length equal to or slightly shorter than the length of the recess 2 of the die part. The cut length of the scrap should be substantially equal to or shorter than the length of the container of the extrusion press machine in which the formed billet is to be loaded. The cut scraps in the form of bars are piled up to form a scrap aggregate 5, in a manner such that the longitudinal axes of the scrap are in agreement with the longitudinal axis of the recess 2.

Prior to piling the scraps in the recess 2, metallic bands or wires 7 may be arranged spaced apart from each other in the recess 2 as shown in FIG. 1. The bands or wires 7 should be of the same metallic material as the scraps. The bands or wires are located along the wall of the recess 2 in a direction perpendicular to the axis of the scrap aggregate 5. The metallic bands or wires 7 should be longer than the peripheral length of the billet, so that the billet to be formed can be bundled by the metallic bands or wires. It is however to be noted that the scraps may be directly piled in the recess 2, without the bands or wires 7.

The male die part 3 is lowered to form the scrap aggregate 5 into a cylindrical billet. When the male die part 3 is lowered to the predetermined lowermost position, the scrap bars are forced into contact with the neighbouring bars to an extent that they cannot be easily separated from each other. Since the scraps of the typical extruded goods are of complicated, irregular cross sections, the scraps are compressed so that they are brought into contact with the neighbouring scraps at extremely different parts of each scrap. For example, a protruding part of a scrap bar is forced into a groove of a neighbouring scrap bar, or scrap bars provided with several grooves are forced to engage each other at each groove. The scrap bars, therefore, can reliably be engaged with each other due to the pressure exerted by the male die part 3 throughout the billet. The scrap aggregate 5, however, is not deformed into a complete compact body and, consequently, numerous strands of clearances between the scrap bars are left running longitudinally through the scrap aggregate 5. The longitudinal clearances terminate at the ends of the scrap aggregate 5.

Figure 2:
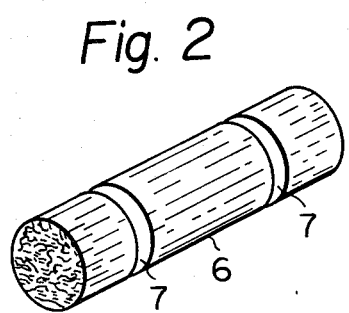
FIG. 2 is a view of the billet formed by the dies shown in FIG. 1.

The male die part 3 is lifted to the original position and the compressed scrap aggregate 5 is removed from the female die part 1. The bands 7 (FIG. 2) are fastened around the billet 6.

Figures 3, 4:
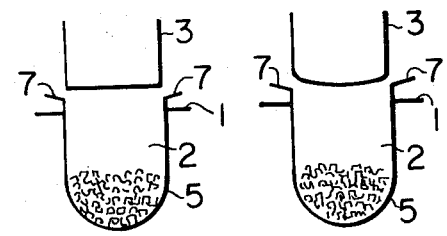
FIG. 3 is a cross sectional, diagrammatic view of another example of the dies.
FIG. 4 is a view similar to FIG. 3 showing still other example of the dies.
Figure 5:
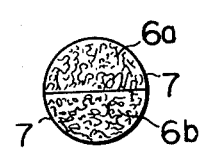
FIG. 5 is a cross sectional, diagrammatic view of the billet formed by the dies shown in FIG. 3.
Figure 6:
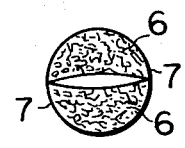
FIG. 6 is a view similar to FIG. 5 showing the billet formed by the dies of FIG. 4.

In another embodiment illustrated in FIG. 3, the lower end surface of the male die part 3 is flat. The billet section formed by the die parts 3 and 5 has a semicircular cross section. A pair of the billet sections 6a, 6b is coupled by fastening bands 7 (FIG. 5) so as to fix their relative position and produce one billet. The obtained cylindrical billet is then extruded. In another embodiment, which is illustrated in FIG. 4, the lower end surface of the male die part 3 is slightly rounded. The billet formed by the die parts 3 and 5 is crescent shaped. A pair of the crescent shaped billets 6a, 6b is coupled by fastening bands 7 (FIG. 6), so as to fix their relative position, and the coupled billets are then extruded. In the embodiments illustrated in FIGS. 3 and 4 the half section billets 6a, 6b include scrap bars rigidly engaged with each other and longitudinal clearances.

Although the embodiments of the present invention illustrated in the drawings have been described, it will be clear to a person skilled in the art that the invention is also embodied in various other forms. The female die part and the male die part may be provided with a flat bottom and a semicircular wall, respectively. The cross sectional shape of the billet is not limited to round, but may be any shape such as square, oval, or any shape favourable for the extrusion of the goods.

From the forgoing description of the embodiments, it will be understood that the method according to the present invention requires neither a machine for breaking the metal scraps into metal chips nor melting apparatus. It is, therefore, possible to reduce the cost for energy used and the cost for plant installation with the present invention.

The billet formed by the process of the present invention can be extruded as follows.

The billet or billets with or without the fastening bands are heated and then loaded into a container of an extrusion press machine. The air in the longitudinal clearances is degassed in the container, in which the billet or billets are isolated from the ambient air. This is accomplished by a vacuum degassing device connected to the container to remove the air in the clearances. Since the clearances extend through the billet in the longitudinal direction, the air in the clearances is easily degassed and is not enclosed in the billet, with the result that essentially no air is container in the billet being extruded in the extrusion press machine. The obtained extruded goods from the formed billets according to the process of the present invention are substantially free from surface defects, which results from the air escaping from the interior of the billet. However, a few surface defects may appear, particularly on the rear end of the extruded goods, depending upon the density of the billet and the degassing condition.

The mechanical properties of extruded goods from the scraps formed by the method of the present invention are not inferior to those obtained from the cast billet.

The present invention is further illustrated in detail by way of the following Example.

EXAMPLE

Scraps of extruded, aluminum alloy-sash bar were reclaimed by employing dies as shown in FIG. 1. The aluminum alloy was a type designated as JIS-A6063. 50 scrap bar pieces were cut into a predetermined length of 350 mm. The cut scraps, weighting 18 kg, were dipped into a solution of 5% NaOH. The scrap bars were then piled up to have a length of 350 mm in the recess of the female die. An external force of 200 metric tons was applied to the scrap aggregate by lowering the male die part, until the scrap aggregate was reduced to a cylindrical body of 178 mm diameter. The relative specific density was 83%.

Figure 7:
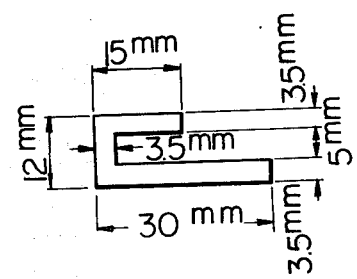
FIG. 7 is a cross-sectional, diagrammatic view showing the cross-sectional dimensions of extruded sash bars which were processed using dies as shown in FIG. 1.

The extrusion was performed under the following conditions. The preheating temperature of the billets was 500° C.; the temperature of the container of the extrusion pressing machine was 400° C.; the length of the container was 730 mm; the number of die openings was 4; the extrusion force was 1800 tons; the vacuum condition of the container was 50 Torr, and; the cross sectional dimension of the extruded sash bars was as shown in FIG. 7. As a result of the extrusion, sash bars of 28 m in length were produced.

Several test pieces of the obtained extruded sash bars were subjected to colored anodic coating. The surface qualities of the sash bars proved not to inferior to the sash bars produced from conventional cast billets.

The extruded sash bars were subjected to an inspection of air bubbles present on their surfaces by observing with the naked eye. As a result of this test, the front end surface, and the side surfaces of each sash bar, proved to be completely free from pores greater than 1 mm, except for a side surface of a rear part with respect to the extrusion direction. This side surface which covered approximately 10 m from the rear end of each bar, contained 2 or 3 blow holes greater than 1 mm. The rear end surface of each sash bar contained on the average six air bubbles.

One test piece of the sash bars was solution-treated and aged. This test piece was subjected to a mechanical test. The results were as follows. The tensile strength was 20.8 kg/mm$^2$; the 0.2% yeild strength was 18.3 kg/mm$^2$ and; the elongation was 8.1%. These values satisfy those of the JIS-standard, i.e. the tensile strength should be not less than 15.0 kg/mm$^2$, the 0.2% yeild strength should be not less than 11.0 kg/mm$^2$ and the elongation should be not less than 8%.

We claim:

1. A process for forming extruded goods which are substantially free from surface defects, from scrap bars of extruded goods, said scrap bars having an irregular cross-section and being selected from the group consisting of aluminum and its alloys, comprising the steps of:
   cutting said scraps into bars having a predetermined length;
   piling up a number of said scrap bars in a recess of a female die part which recess is grooved in one direction of said female die part, by first arranging metallic bands or wires along the wall of said recess and in a direction perpendicularly crossing the longitudinal axes of said cut scrap bars to be piled, said metallic bands or wires having a length greater than the peripheral length of said cut scrap bars to be piled, then piling said cut scrap bars by laying same on said bands or wires in a manner such that the longitudinal axes of said cut scrap bars are in agreement with the longitudinal axes of said recess, and said cut scrap bars are parallel to each other, clearances are formed therebetween, and the ends thereof are even, and then fastening and tying said bands or wires around said piled cut scrap bars, thereby forming a scrap aggregate having a predetermined length;
   exerting an external force on said scrap aggregate in directions perpendicular to the longitudinal axes of said scrap bars by advancing a male die part into said recess of said female die part thereby forming a billet based upon the density of the metal of said scrap in the range between 70 and 90 percent, said billet containing clearances running through said billet in the longitudinal direction and terminating at the ends of said billet;
   preheating said billet;
   loading said preheated billet in a container of an extrusion press machine provided with a device for degassing the air in said billet;
   degassing the air contained in said clearances through the terminating ends of said clearances, while said billet is contained in said container; and
   extruding said degassed billet, whereby said extrusion is substantially free from surface defects.

2. A process according to claim 1, wherein in said degassing step, said billet is isolated from the ambient air, whereby the air in said clearances is essentially removed.

3. A process according to claim 1, wherein said steps comprise the ordered steps of claim 1.

4. A process for forming extruded goods which are substantially free from surface defects, from scrap bars of extruded goods, said scrap bars having an irregular cross-section and being selected from the group consisting of aluminum and its alloys, comprising the steps of:
   cutting said scraps into bars having a predetermined length;
   piling up a number of said cut scrap bars in a recess of a female die part which recess is grooved in one direction of said female die part, by first arranging metallic bands or wires along the wall of said recess and in a direction perpendicularly crossing the longitudinal axes of said cut scrap bars to be piled, said metallic bands or wires having a length greater than the peripheral length of said scrap bars to be piled, then piling said scrap bars by laying same on said bands or wires in a manner such that the longitudinal axes of said cut scrap bars are in agreement with the longitudinal axes of said recess, and said cut scrap bars are parallel to each other, clearances are formed therebetween, and the ends thereof are even, and then fastening and tying said bands or wires around said piled scrap bars, thereby forming a scrap aggregate having a predetermined length;
   exerting an external force on said scrap aggregate in directions perpendicular to the longitudinal axes of said scrap bars by advancing a male die part into said recess of said female die part thereby forming one section of a billet which section has a cross-sectional configuration corresponding to half of a billet based upon the density of the metal of scrap in the range between 70 and 90 percent, said billet containing clearances running through said billet in the longitudinal direction and terminating at the ends of said billet;
   repeating said piling step and said step of exerting an external force so as to form another section of the billet so that each of the billet sections forms a cross-sectional configuration corresponding to half of that of a billet;
   coupling said two sections to form a billet containing clearances running therethrough in a longitudinal direction and terminating at its ends; preheating said billet;

loading said preheated billet in a container of an extrusion press machine provided with a device for degassing the air in said billet;

degassing the air contained in said clearances through the terminating ends of said clearances, while said billet is contained in said container; and extruding said degassed billet, whereby said extrusion is substantially free from surface defects.

* * * * *